M. B. LLOYD.
MECHANISM FOR CUTTING TUBING AND THE LIKE INTO LENGTHS.
APPLICATION FILED MAY 12, 1913.
1,161,705.
Patented Nov. 23, 1915.
4 SHEETS—SHEET 3.
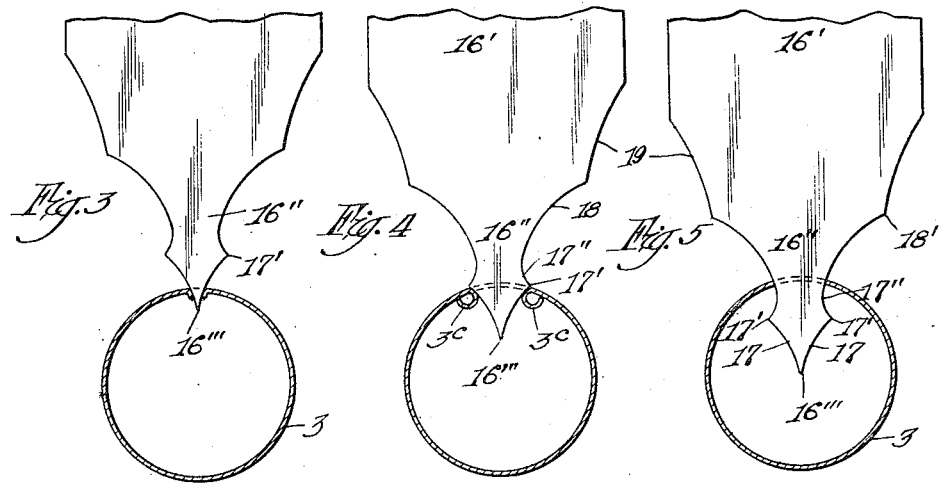
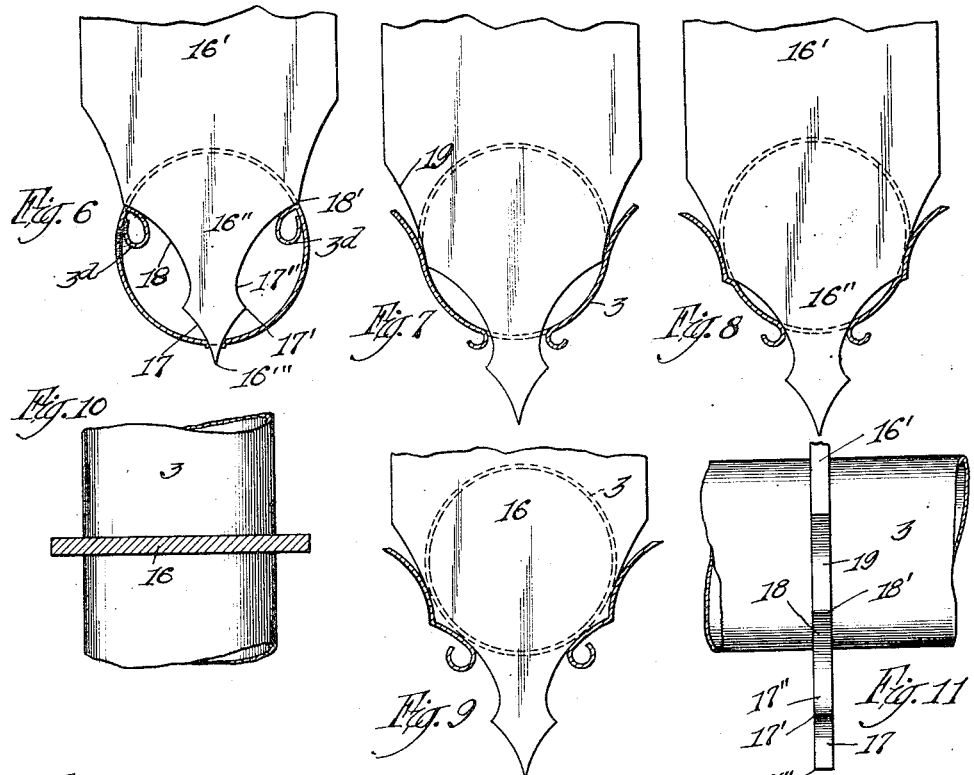
Witnesses:
Earl E. Howe
Arthur W. Nelson
Inventor:
Marshall B. Lloyd.
By [signature]
Atty.

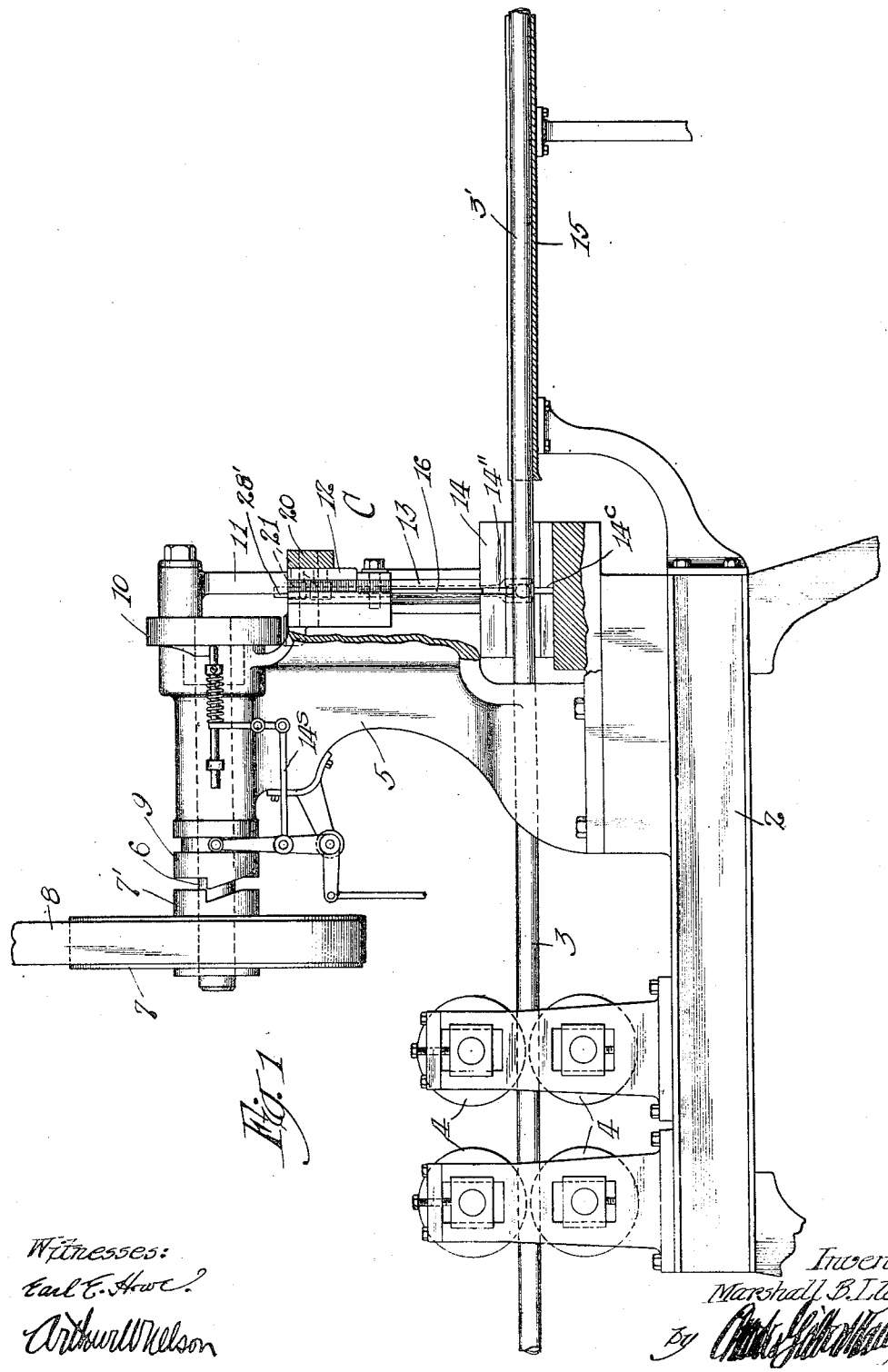

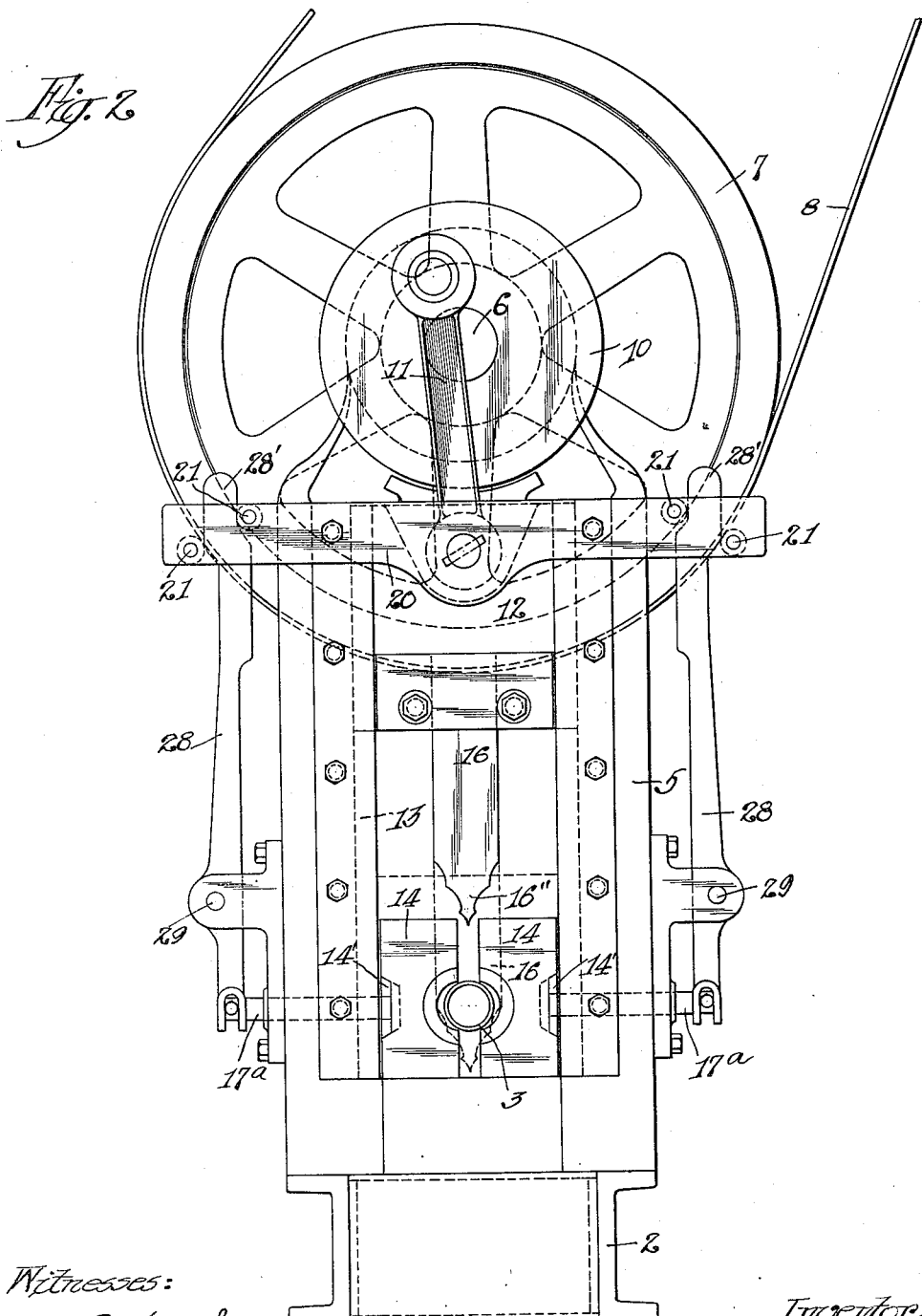

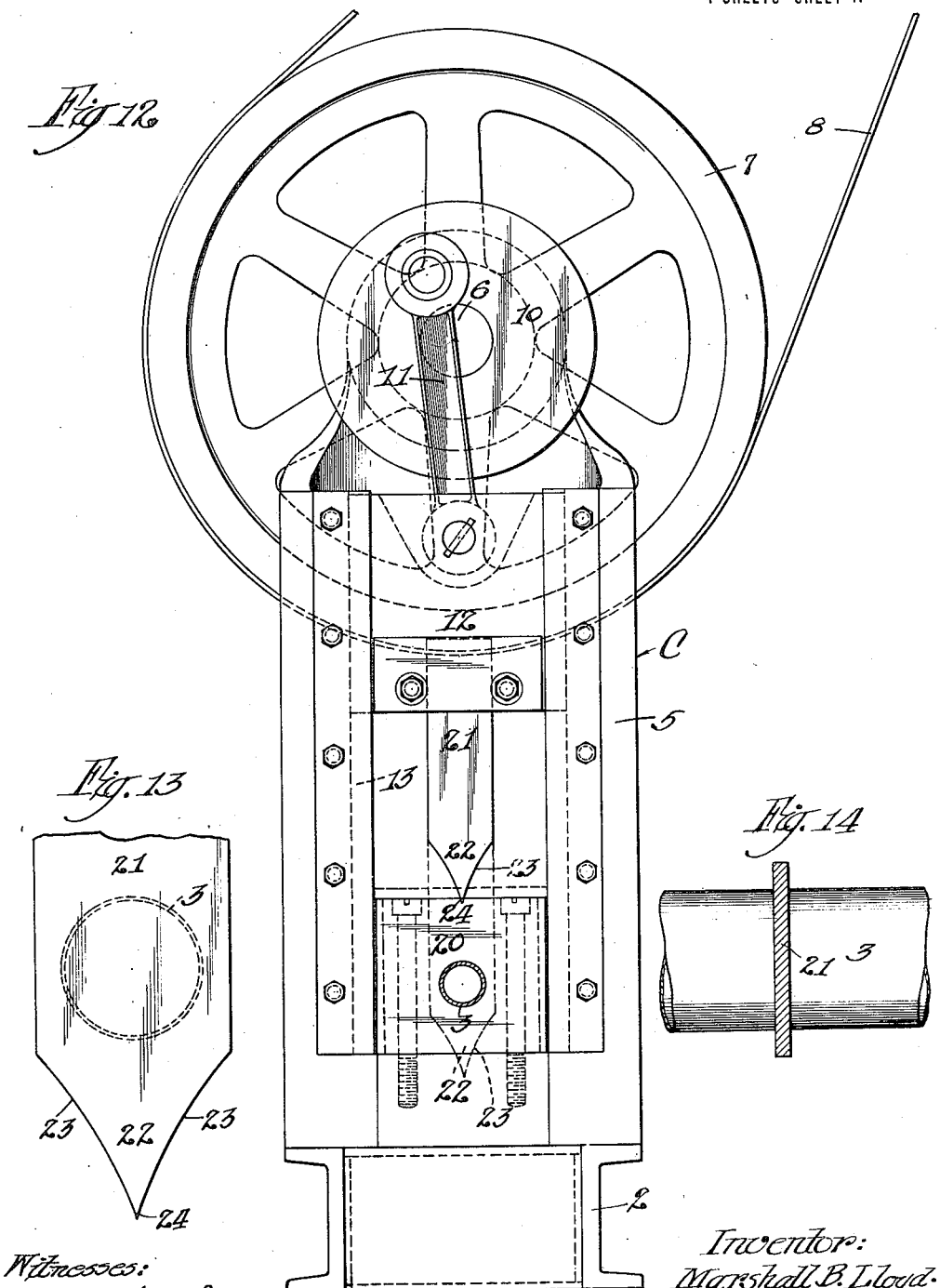

UNITED STATES PATENT OFFICE.

MARSHALL BURNS LLOYD, OF MENOMINEE, MICHIGAN, ASSIGNOR, BY MESNE ASSIGNMENTS, TO THE ELYRIA IRON & STEEL COMPANY, OF ELYRIA, OHIO, A CORPORATION OF OHIO.

MECHANISM FOR CUTTING TUBING AND THE LIKE INTO LENGTHS.

1,161,705.            Specification of Letters Patent.      Patented Nov. 23, 1915.

Application filed May 12, 1913. Serial No. 767,161.

*To all whom it may concern:*

Be it known that I, MARSHALL B. LLOYD, a citizen of the United States, and a resident of Menominee, county of Menominee, and State of Michigan, have invented certain new and useful Improvements in Mechanism for Cutting Tubing and the like into Lengths, of which the following is a specification.

The general object of my invention is to provide mechanism for cutting hollow metallic articles such, for example, as tubing, into desired lengths quickly and at low cost; and a further object is to provide mechanism for cutting tubing into lengths without burring or deforming the resulting tube ends.

My invention consists generally in mechanism for cutting tubing into lengths comprising tube-holding means, a cutting tool and means for forcing the cutting tool through the tube to shear a complete transverse section from the tube.

My invention consists further in a tool for cutting tubing into lengths consisting of a thin, flat blade having opposed beveled or sloping cutting edges, the tool being adapted under the influence of a force to cut or shear a transverse cross section from a tube held in its path.

My invention consists further in the arrangement, construction, and coöperation of the parts whereby the objects named above, and others which will appear hereinafter are attained.

My invention will be more readily understood by reference to the accompanying drawings in which:

Figure 1 is a side elevation of tube-cutting mechanism embodying my invention; Fig. 2 is an enlarged front elevation thereof; Figs. 3 to 11, inclusive, are enlarged detail views illustrating different positions of the cutting tool in the tubing; Fig. 12 is a front elevation of tube-cutting mechanism of slightly modified construction; and Figs. 13 and 14 are enlarged detail views of the cutting tool in tube-severing position.

It has been customary hitherto for the purpose of cutting tubing into lengths to provide a plurality of colter wheels which are rotatable around and which are gradually forced into the tube; a saw rotated at high speed which is passed through the tube; or a flat emery or other grinding wheel rotated at high speed and passed through the tube somewhat after the manner of a saw. These tube cutting mechanisms are not only expensive in construction, operation and maintenance, but furthermore score or bur the ends of the tubing considerably. For certain purposes it is necessary to have tube ends which are not burred or deformed and for such use it is necessary for the present-day mechanisms to subject the tubes to another operation to remove the bur and to re-form the tube if distorted. It is obvious that the cost of tubing is thereby greatly increased.

I shall now describe in detail my unique mechanism whereby the tubing can be cut into lengths without burring or distorting the resulting ends and which mechanism can be constructed and operated at low cost. The tube-cutting mechanism C is preferably mounted upon a strong bench or table 2 to raise same to a convenient working height. The tubing 3 is preferably guided to the cutting mechanism by means of rolls 4 also supported on the bench or table. These rolls may be driven, if desired, to propel the tube in which case mechanism (not shown) is provided to stop them during the cutting operation. The guide rolls 4 are not an essential part of this invention, being provided merely as a convenient means of guiding the tube to the cutting mechanism. The mechanism C comprises a main frame or standard 5, rigidly secured to the table 2, and carrying in its upper portion a shaft 6. Loosely mounted upon the shaft 6 is a pulley 7 which may be driven by any suitable source of power by means of the belt 8. The pulley 7 is provided with a clutch portion 7′ for coöperation with the shiftable clutch 9 which is splined to the shaft 6. Secured to the shaft 6 at the end opposite to the pulley 7 is a circular blank 10 which is keyed to the shaft 6 and pivotally secured to the blank 10 is a crank arm 11, the other end of which carries a cross head 12 which is mounted for reciprocation in suitable guides 13 in the frame 5. Suitable starting and stopping mechanism 14 is provided so that movement of a foot pedal serves to throw the clutch 9 into engagement with the clutch 7′ causing the shaft 6 to rotate and thereby to reciprocate the cross head 12. This mechanism is of the ordinary stop-motion class, such as is used upon a punch press, and it will not therefore be described herein. It may be said, however, that it is adapted upon a single revolution of the shaft 6 to withdraw the clutch 9 and stop the cross head 12 in a definite position. The tubing 3 passes through a block 14 below the cross head and the extending end 3' thereof is supported by a guide 15. Mounted in the cross head 12 is my unique cutting tool 16. If it is desired to sever the tube at right angles to its longitudinal axes I mount the tool at right angles to the longitudinal axes of the tube and if it is desired to cut the tube on some other angular line I mount the tool accordingly. This is preferably a thin, flat, metallic member having opposed beveled or curved cutting ends. Upon the reciprocation of the head 12 the knife 16 is projected forcibly through the tubing, thereby removing a transverse section of the tube and cutting it into two parts. This operation is performed in an instant and in fact I find that better results are obtained by forcing the tool quickly into the tube than by slowly forcing it thereinto.

While it is not necessary positively to clamp the tube during the cutting period, as will be explained hereinafter, I prefer to do this when cutting tubes of certain sizes and material. I therefore provide a mechanism whereby the downward movement of the cross head causes the tube to be firmly clamped circumferentially thereof. The block 14 is split longitudinally and, in fact, comprises four individual blocks, two on either side of the tube, being rigidly secured together by a member 14' for simultaneous movement to and from the tube. Members 17ª secured in the blocks 14 extend outwardly through the frame 5 and are secured at their outer ends by means of pin-and-slot connection, to arms 28 which are pivoted to the frame 5 and 29. Secured to the cross head 12 is a cross bar or strap 20 carrying at its outer ends two spaced pins or rollers 21 between which the upper ends 28' of the levers 28 extend. The upper ends of the lever are formed so that downward movement of the cross head causes the pin or rollers 21 to swing the upper end of the levers outwardly and thereby move the blocks 14 inwardly and clamping the tube. The blocks or clamps 14 are released from the tubes by the upward movement of the cross head. In this manner the tube is firmly held or secured circumferentially for a considerable distance upon each side of the opening 14'' through which the cutting tool or blade 16 operates, and any danger of crushing or distorting thin light tubing is thereby avoided.

Having thus described the general operation of my tube-cutting mechanism, I shall describe in detail my unique cutting tool and its cutting operation, reference being had particularly to Figs. 2 to 11 inclusive. The tool or blade 16 is made preferably of thin flat material of a width greater than the tube which it is intended to sever. The tool comprises a shank or body portion 16' and an end or cutting portion 16''. The cutting end comprises a plurality of opposed cutting portions 17 diverging from the point 16''' in curved paths terminating in shoulders 17'. The second set of cutting portions 18 curve inwardly from the shoulders 17' and thence outwardly terminating in shoulders 18', and the last set of cutting portions curve from the shoulder 18' to the sides of the tool. While I have here shown three sets of opposed cutting portions I may provide a greater or lesser number, the size of the tube, gage of the metal, and also the quality thereof determining in a measure the number which serve best to sever the tube. I find, however, that the three sets of cutting portions serve admirably under a great variety of conditions. The cutting operation of the tool is substantially as follows: First the point 16''' starts through the tube curling the metal inwardly as it moves and by the time the cutting tool has forced itself to the first shoulder 17' curled portions 3$^c$ of considerable size have formed on either side of the tool. Further downward movement of the tool shears the chips 3$^c$ and since the tool is reduced at 17'' just above the shoulder 17' sufficient clearance is provided for the chips 3$^c$. Further movement of the tool 16 curls new portions of the tube inwardly and when the tool reaches the position shown in Fig. 6 chip portions 3$^d$ are again formed on each side of the tool. Further movement of the tool shears the chips 3$^d$ and at the same time the point of the tool perforates the bottom and, as the tool proceeds, shears the lower tube portions by means of the cutting portions 17 and at the same time the cutting portions 19 shear the tubing from above as is clearly shown in Figs. 7, 8, and 9. When the tool has been projected through the tube a complete transverse section thereof is moved and the tube is thereby severed, as is clearly shown in Figs. 10 and 11.

It should be noted that the tool acts to remove the transverse section of the tube in small portions by first curling a chip and shearing it, then proceeding to curl and remove another chip and so on. In this manner a clean cut, i. e., non-burring cut is obtained and the tubing is not distorted. The clear shearing action of the tube is greatly enhanced by the firm circumferential gripping of the tube on each side of the cutting tool by the blocks 14. These cutting faces or edges 17, 18, and 19 may, for the sake of convenience, be termed "chip shearing and clearing portions" as they act to shear a chip and to provide sufficient clearance therefor so that the tool itself proceeds to cut the next chip free of the first chip. The block portions 14ᶜ defining the opening 14″ in which the tool operates, coact with the cutting tool in the shearing operation.

As previously stated, it is not essential for all purposes to provide the cutting tool with a plurality of curved cutting portions nor is it essential for all purposes to clamp the tubing during the cutting operation. I have illustrated in Figs. 12, 13, and 14 a modified and simplified form of my invention. In this instance the block 20 through which the tube passes is simply bored to tube size or a size so much larger as will permit free movement of the tube therethrough and it differs from the tube-holding block shown in Figs. 1 and 2 in that it is not designed to clamp the tube, but simply to support it against the action of the cutting tool and to provide coacting shearing edges. The cutting tool in this form is a thin, flat, metallic strip having a body portion 21 for attachment to the cross head, or other reciprocating member, and a cutting end 22. The cutting end 22 comprises two opposed curved cutting portions 23 which terminate in a point 24. The cutting tool in this instance, as in the former, is wider than the tube which it is intended to sever. When the blade is forced downwardly the end pierces the tubing, curling it inwardly and ultimately removing a complete transverse cross section of the tube of blade width. This is clearly shown in Figs. 13 and 14, the tube being shown in dotted lines in Fig. 13 and the blade being shown in its lowest position between the severed ends of the tube in Fig. 14.

It is obvious that the objects outlined in the opening of the specification are attainable by the mechanism herein shown and described, but since others will readily see other modified structures whereby the substantial objects of my invention may be attained, I do not wish to limit my invention to the exact construction and arrangements herein shown and described.

I claim:—

1. In mechanism for cutting tubing the combination of a tube holding member, with a cutting tool consisting of a thin flat body portion having a cutting end each edge comprising opposite chip-shearing portions and chip-clearing spaces, and means for reciprocating the cutting tool through the path of the tube.

2. In mechanism for cutting tubing, the combination of a reciprocating tool carrying head, with a flat cutting tool having opposed beveled cutting faces, and tube clamping blocks located in the path of said tool and operable by the movement of the head toward the tube to clamp the tubing and by a movement of the head from the tube to release the clamps.

3. A tube cutting tool consisting of a thin, flat metallic member having opposed beveled or sloping cutting edges, each edge comprising a plurality of curved shearing edges reducing the tool from its maximum width substantially to a point at the end.

4. A tool for severing tubing comprising a thin, substantially rectangular body portion and a pointed cutting portion, the cutting portion comprising parallel side faces, and a plurality of cutting portions disposed at right angles thereto, said cutting portions being curved to provide a plurality of chip-removing shoulders and chipped clearing spaces.

5. A tool for cutting tubing into lengths which consists of a flat metal strip having a plurality of opposed curved cutting portions at right angles to the sides of said strip, said tool being adapted for projection through a tube and thereby successively to remove thin strips of the tube and ultimately thereby to remove a complete transverse cross section of the tube.

6. A tool for cutting tubing which consists of a flat metallic member substantially rectangular in cross section, a plurality of opposed curved portions reducing the tool at the end substantially to a point, the various cross sections through the reduced end portion also being substantially rectangular, the edges being at right angles to the side faces of the member.

7. A tube-cutting tool of thin, flat material, a cutting end thereof reduced substantially to a point and comprising a plurality of pairs of opposite cutting portions, each pair having a different curvature.

8. A tube cutting tool of thin, flat material, a cutting end thereof reduced substantially to a point and comprising a plurality of pairs of curved opposite cutting portions, said cutting ends being substantially rectangular in all its transverse cross sections, the cross-sectional width gradually increasing from the point for a distance then decreasing in width and again increasing in width, as and for the purpose specified.

9. Mechanism for cutting thin-walled tubing into lengths without the aid of an internal support or mandrel, comprising a holder substantially fitting tubing at the place where it is to be cut and containing a slot for the cutting knife, in combination with a knife adapted to work in said slot, said knife being substantially V-shaped and terminating substantially in a line, the opposed edges of the V-shaped portion being formed at right angles to the side faces of the knife whereby a complete section of the tube can be cleanly removed without crushing it.

10. In mechanism for cutting internally unsupported tubing into lengths, a reciprocating cutting tool holder, in combination with a flat, thin, cutting tool mounted therein and being formed with opposed beveled or sloping cutting edges at right angles to the side faces of the tool, and means for holding the tube in the path of said cutting tool and transverse to the plane thereof.

11. In mechanism of the class described, a tool-carrying head, in combination with a flat cutting tool having opposed flat cutting faces which converge to a point, a tube support, external to the tube, located in the path of said tool, substantially as described.

12. In mechanism for cutting tubing into lengths, a tube cutting tool formed and adapted to remove a transverse section from an internally unsupported tube and comprising a relatively wide thin metallic member having substantially parallel front and back and having flat cutting faces which converge.

13. Mechanism for cutting tubing into lengths without the aid of an internal support, comprising an external tube-support, in combination with a knife arranged to reciprocate in a plane which intersects the supported position of the tube, said knife having a substantially V-shaped point terminating in a line, and the opposed edges of the V-shaped portion being formed at right angles to the side faces of that portion to remove a complete section of the tube, and means for thrusting the V point of the knife through the tubing.

14. In a machine for cutting tubes, a sliding cutter with an advanced cutting edge and forwardly projecting cutting edges in rear of said advanced edge, the front of the cutter being curved in concave form between said edges.

15. In a machine for cutting tubes, a sliding cutter having a central cutting edge on its front, and a series of forwardly projecting cutting edges flanking the central cutting edge and in rear thereof, the front of the cutter having concave contours between the cutting edges.

16. A tube cutter consisting of a flat plate with its front edge formed with an advanced cutting edge and with cutting edges flanking the advanced edge, the flank edges being in rear of the advanced edge, but projecting forwardly the material between the edges being curved to provide substantially concave recesses.

17. In a machine for cutting tubes, a clamp consisting of separable members, the members having a tube opening, the clamp having a slot therein, said slot lying in a plane that crosses the tube opening, and a cutter sliding in the slot, the cutter having its front face formed into cutting edges arranged in echelon with concave recesses between them.

18. A tube shearing device, comprising a die adapted to surround the periphery of the tube to be severed, and a shearing blade having a piercing point and divergent shearing edges movable in a plane adjacent to said die to shear the tube outward when held solely by the surrounding die.

19. A tube shearing device, comprising a die for surrounding the periphery of the tube to be severed, and a shearing blade adapted to pierce said tube and to shear the same outward when held by said die.

20. A tube shearing device, comprising a die for surrounding the tube to be severed, a shearing blade adapted to pierce said tube and to shear the same outward while supported solely by said die, said shearing blade engaging a transverse slot in said die and adapted to sever and remove the portion of the tube in registration with said slot.

21. The combination with a shearing-blade having a piercing point, of a split die for surrounding a tube, transversely slotted for the passage of said shearing blade, and means operating upon the initial descent of said blade for clamping said split die to said tube.

22. The combination with a die for surrounding a tube and having a transversely-extending slot, of a shearing blade movable in said slot, having a point for centrally piercing said tube and oppositely - angling sides for shearing the portions of the tube crossing said slot in an outward direction.

In testimony whereof, I have hereunto set my hand this 8th day of May, 1913, in the presence of two subscribing witnesses.

MARSHALL BURNS LLOYD.

Witnesses:
ARTHUR W. NELSON,
M. SIMON.